INVENTOR
BY G. J. STEELE
ATT'YS.

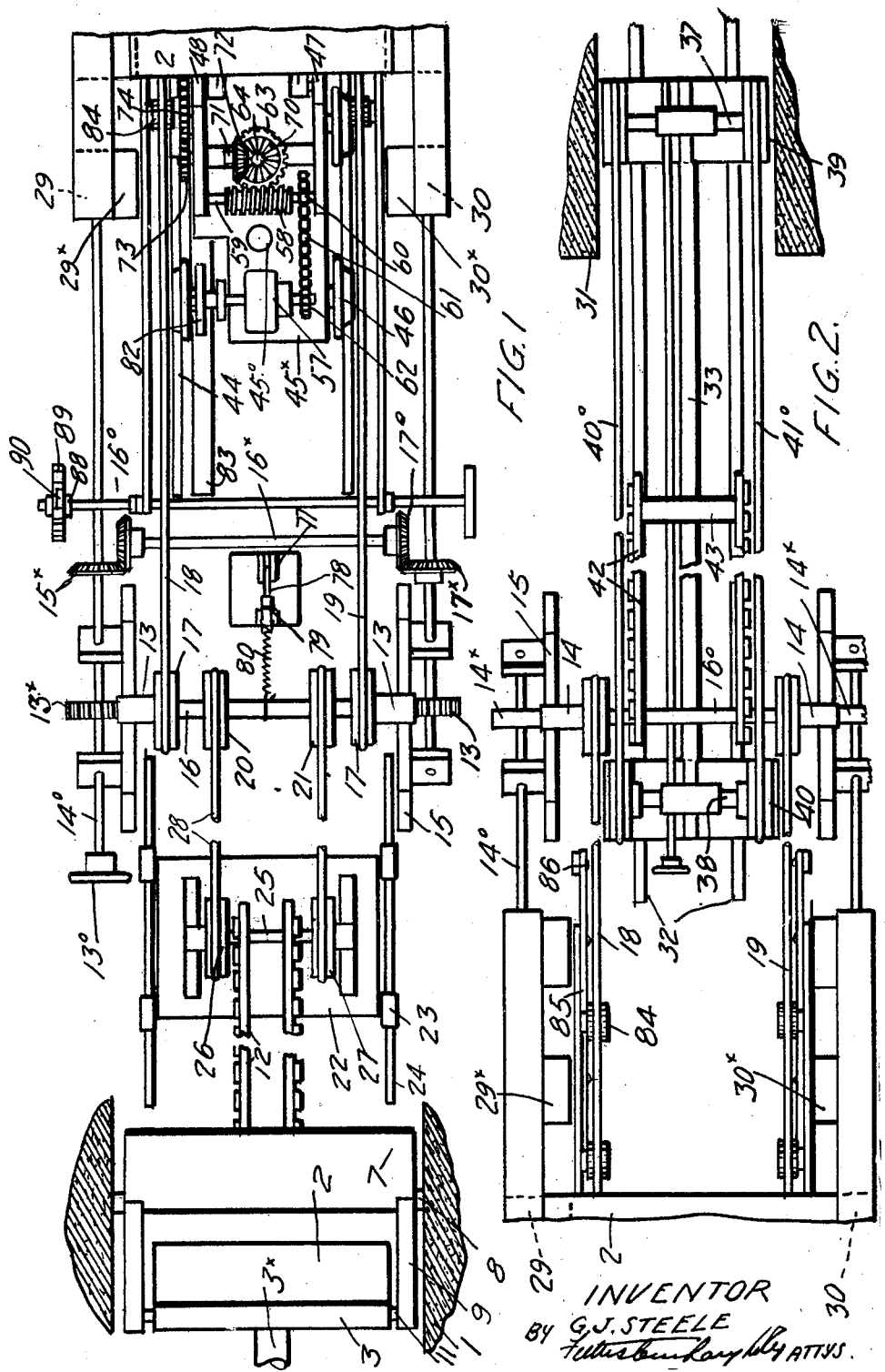

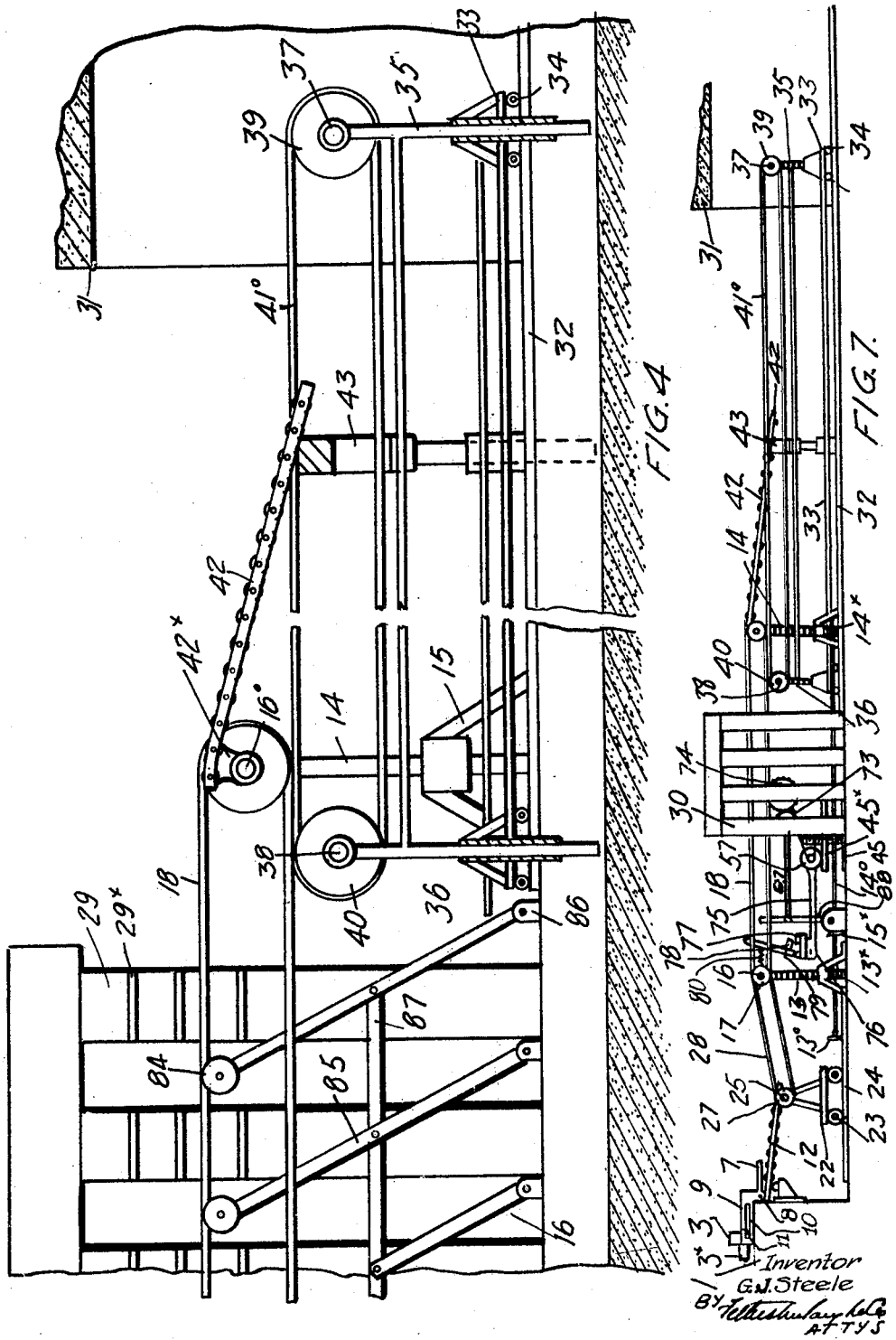

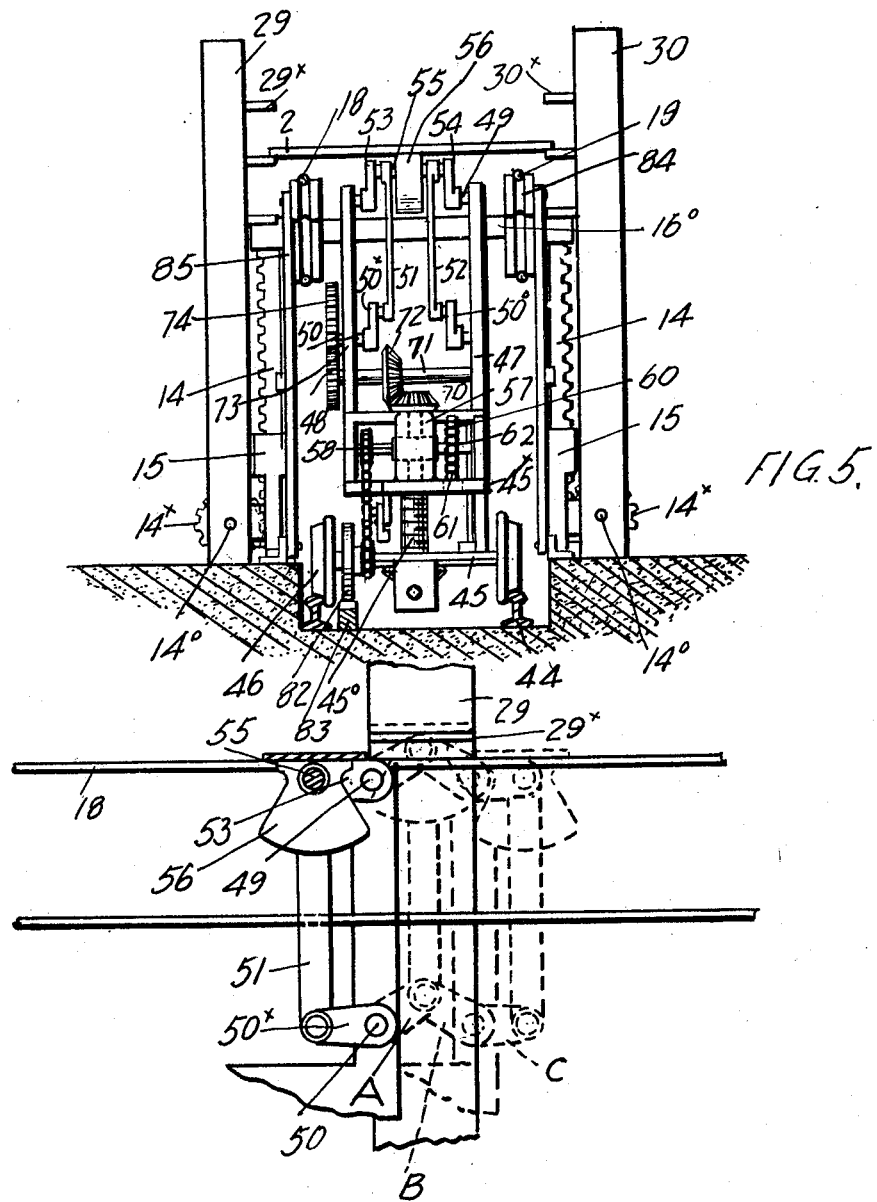

Patented Jan. 22, 1929.

1,699,637

UNITED STATES PATENT OFFICE.

GILMOUR JOHNSON STEELE, OF TORONTO, ONTARIO, CANADA.

APPARATUS FOR AUTOMATICALLY-TRANSFERRING BRICKS FROM PRESS TO RACK AND FROM RACK TO KILN.

Application filed November 9, 1927. Serial No. 232,127.

My invention relates to improvements in an apparatus for automatically transferring bricks as they are discharged from a brick press onto the drying racks and for transferring them from the drying racks to the kiln, and it consists essentially of the arrangement and construction of parts as hereinafter more particularly explained.

Fig. 1 is a plan view of the left hand portion of my apparatus.

Fig. 2 is a plan view of the right hand portion.

Fig. 4 is a longitudinal sectional view through Fig. 2.

Fig. 5 is a transverse sectional view on line 5—5 Fig. 1 looking towards the right.

Fig. 6 is an enlarged detail of the mechanism for transferring the pallets carrying the bricks from the conveyors travelling from the brick machine onto the rack ledges and retransferring the pallets and bricks from the rack ledges onto the conveyors travelling to the kiln. Fig. 7 is a side elevation of my complete apparatus.

In the drawings like characters of reference indicate corresponding parts in each figure.

Figure 3:
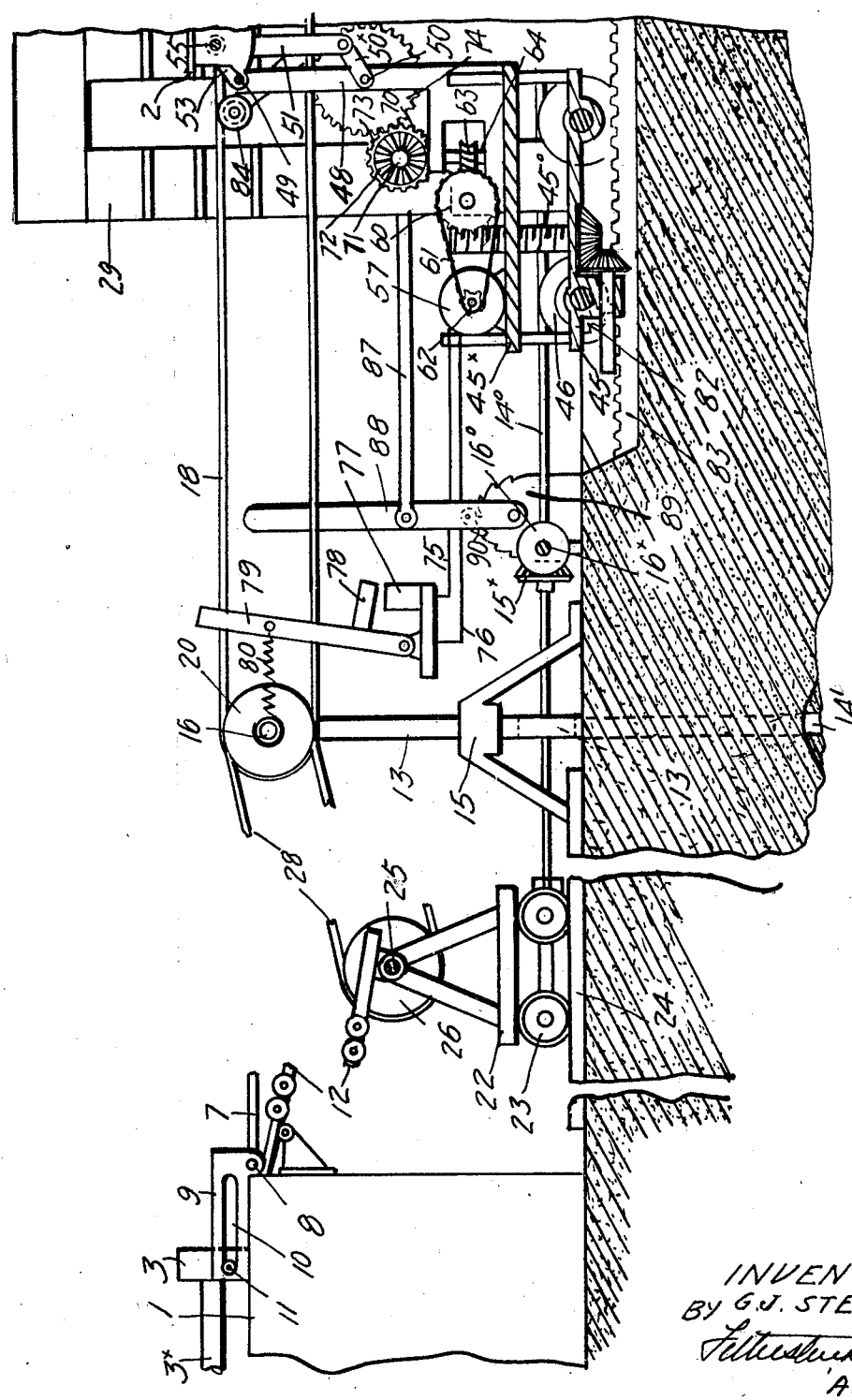
Fig. 3 is a longitudinal sectional view through Fig. 1.

1 indicates a brick machine. 2 is a pallet upon which the bricks discharged are received. 3 is a plunger provided with a plunger rod $3^x$ which is reciprocated by any suitable mechanism to carry the pallet and the bricks thereon forward onto a tilting plate 7 which is pivoted at 8 and provided with a rearwardly extending arm 9 provided with a slot 10 in which are projections or rollers 11 extending from the plunger 3.

When the plunger moves forward the pallet is forced in a corresponding direction onto the plates 7, and when the pallet is in position on the plate 7 the projections 11 strike the ends of the slots 10 so as to tilt the arm 9 and swing the free end of the plate downward into an inclined position. The pallet 2 then slides off the inclined plate 7 onto the inclined roller conveyor 12.

13 and 14 are standard racks mounted to each move vertically in a guideway $14^1$ and guide bracket 15. The upper ends of the standard racks 13 and 14 are provided with bearings in which is journalled a shaft 16 and on which are mounted pulley wheels 17 spaced apart and carrying endless conveyor cables 18 and 19 spaced apart a distance less than the length of the pallet so that the pallet in travelling thereon may be supported transversely thereof. The shaft 16 is driven from any suitable source of power.

$13^x$ and $14^x$ are gear pinions secured to spindles $14°$ mounted in suitable bearings such as indicated and provided at one end with an operating wheel $13°$. The spindles $14°$ are provided with bevelled gears $15^x$. $16^x$ is a cross shaft provided at one end with a bevelled gear $16°$ meshing with the bevelled gear $15^x$ and at its opposite end with a bevelled gear $17°$ meshing with the bevelled gear $17^x$ secured to a spindle $14°$ located on the opposite side of the device and corresponding to the spindle $15°$, the spindle $14°$ being provided with gear pinions corresponding to the gear pinions $13^x$ and $14^x$ meshing with racks corresponding to the racks 13 and 14 carrying the opposite ends of the shaft 16 and $16°$.

By this means it will be seen that the cables 18 and 19 are raised and lowered simultaneously.

20 and 21 are pulleys similar to the pulleys 17 and mounted in spaced apart positions therebetween. 22 is a carriage provided with carrier wheels 23 which travel on rails 24. 25 is a shaft journalled in the carriage 22 and on which are mounted pulley wheels 26 and 27 in alignment with the pulley wheels 20 and 21. 28 are endless conveyor cables mounted upon pulleys 26 and 27, 20 and 21 and onto which the pallet travelling down the roller conveyor 12 by gravity passes so as to be conveyed upwardly by the endless conveyor cables 28 onto the endless conveyor cables 18 and 19. 29 and 30 are opposing standards upon which extend inwardly opposing rack plates $29^x$ and $30^x$ forming ledges adapted to receive the ends of the pallet 2 when lifted thereonto from the endless conveyor cables 18 and 19 by mechanism hereinafter described.

31 indicates the kiln opening. 32 are rails extending from a point intermediate of the length of the conveyor formed by the cables 18 and 19 to a point at the inner end of the kiln. 33 is a travelling carriage provided with carrier wheels 34 mounted on the rails 32 so that the carriage may be moved longitudinally of the conveyor cables 18 and 19 and at the opposite end to a corresponding position within the kiln.

The carriage 33 is provided with standards 35 and 36 provided with shafts 37 and 38, one of which is driven from any suitable driving source.

39 and 40 are pulleys mounted upon the shafts 37 and 38 which are carried upon standards provided with rack and operating mechanism similar to the standards 13 and 14 and their operating mechanism hereinbefore described, and carrying conveyor cables 40° and 41°. 42 is a roller conveyor similar to the roller conveyor 12 hereinbefore referred to, such conveyor being swung at one end as indicated at 42ˣ on the shaft 16° and freely supported at its opposite end upon a suitable rest 43.

The pallet and bricks carried thereon when conveyed longitudinally upon the endless conveyor cables 18 and 19 are delivered onto the roller conveyor 42 sliding downwardly onto the conveyor cables 40° and 41° so as to be carried longitudinally thereof into the desired position in the kiln. From this position the pallets are manually lifted so that the bricks may be placed in the kiln.

Having described generally the conveyor mechanism by which the pallet and bricks are carried longitudinally between the brick machine and the kiln I will now describe the mechanism by which during their longitudinal travel they are lifted from the conveyor into position upon the racks for the purpose of drying and then returned after a predetermined interval from the racks onto the conveyors to be passed onto the kiln.

44 are rails which extend longitudinally between the rack standards 29 and 30. 45 is a carriage provided with carrier wheels 46 travelling on the rails 44. The carriage 45 is provided with a platform 45ˣ which may be raised and lowered vertically by means of a threaded spindle 45° operated by any suitable mechanism such as that indicated and provided with standards 47 and 48. 49 and 50 are upper and lower crank shafts journalled in the standards 47 and 48.

The lower crank shaft 50 is a divided shaft provided with arms 50ˣ and 50° connected by links 51 and 52 to the arms 53 and 54 of the upper crank shaft. The arms 53 and 54 are connected by a crank pin 55 upon which is freely hung a weighted pallet support 56. 57 is a motor mounted upon the carriage 45 and by which the pallet lifting mechanism is operated. 58 is a worm mounted upon a shaft 59 provided with a sprocket wheel 60 connected by a sprocket chain 61 to a sprocket pinion 62 mounted upon the shaft of the motor 57. 63 is a worm gear secured to a vertical shaft 64 and meshing with the worm 58.

70 is a bevelled gear secured to the upper end of the vertical shaft 69. 71 is a transverse shaft mounted upon the standards 47 and 48 and upon which is secured a bevelled gear 72. 73 is a gear pinion also secured to the transverse shaft 71 and 74 is a gear secured to one portion of the divided crank shaft 71 and meshing with the gear pinion 73.

By this means the crank shaft mechanism is driven from the motor 57, the upper crank arms travelling in the circular path so as to alternately raise and lower the pallet support 56.

The motor 57 is automatically put in and out of operation by the pallets as they are passed onto the conveyor cables 18 and 19 by mechanism which I will now describe.

75 and 76 are lead wires of the motor. 77 are the knife contacts of the knife switch from which one of the lead wires extend. 78 is the knife of the knife switch operated by a lever 79 from which the other lead wire 76 extends. The lever 79 is spring held as indicated at 80.

The discharge of the pallets from the brick machine is so timed that as one pallet comes into position to be lifted from the conveyor cables 18 and 19 onto the racks, the next pallet engages the lever 79 to close the switch and operate the motor 57 thereby revolving the upper and lower cranks 49 and 50 carrying the pallet support 56 upward beneath the pallet in the full line position indicated in Figure 6, carrying such pallet in a circular path, and as it travels over the centre line lowers the pallet onto the rack ledges 29ˣ and 30ˣ.

82 is a fragmentary gear wheel connected to one of the carrier wheels 46 of the carriage 45. 83 is a rack extending parallel with the rail 44 and with which the gear portion of the wheel 82 meshes. When the switch 77—78 is closed, the pallet lifting mechanism is operated from the full line position to the dotted position A to transfer the pallet from the conveyor cables 18 and 19 onto the rack ledges 29ˣ and 30ˣ, this operation taking place during the revolving of the plane portion of the gear past the teeth of the rack 83 and until the toothed portion thereof engages the rack so as to move the carriage one space to lift the next pallet onto the ledges of the next pair of opposing standards 29 and 30.

When it is desired to transfer the pallets from the rack ledges to the conveyor cables the carriage is advanced in position as indicated in Figure 6 by dotted lines so that as the cranks revolve the pallet support first engages the pallet (at the dotted position B) supported on the rack ledges and lifts the pallet from such ledges and lowers it onto the endless conveyor, the mechanism assuming the dotted position C. The pallet then travels onto the roller conveyor 42 and from thence onto the conveyor cables 40 and 42 carrying the pallet into the kiln.

In order to support the cables 18 and 19 when bearing the weight of the pallet and bricks as they pass between the racks I provide idler rollers 84 mounted on levers 85 which are journalled at their lower ends in brackets 86 and connected together intermediately of their length by a pull bar 87 which is pivotally connected to each lever and operated at its end by a lever 88 mounted in a quadrant bracket 89 engaged by a pawl 90 so that the lever may be adjusted to any desired position and thereby raise the rollers 84 to conform to the position assumed by the cables 18 and 19 as they are raised by the racks 13 and 14 and pinions 13× and 14×.

From this description it will be seen that I have devised very simple device which is entirely automatic in its operation for carrying bricks from a brick press and depositing them in drying racks and then after the bricks are sufficiently dried automatically transferring them from such racks into the kiln.

What I claim as my invention is:—

1. In an apparatus for transferring bricks from a press to drying racks and from such racks to a kiln, opposing racks having horizontally aligned opposing pallet supporting ledges arranged in spaced apart vertical rows, a conveyor extending longitudinally between the racks, means for adjusting the conveyor vertically, means for transferring the pallets and bricks from a press onto one end of the conveyor, conveying means adapted to receive the bricks and pallet from the other side of the conveyor to transfer them to a kiln, means for lifting the pallets and bricks from the conveyor onto opposing rack ledges or for lifting the pallet and bricks from the ledges onto the conveyor, and means for moving such pallet lifting means by a step by step movement between the rack members so as to transfer the pallet and bricks successively onto each of the opposing pairs of the horizontally aligned rack ledges.

2. In a device of the class described, the combination with opposing rack ledges arranged in spaced apart vertical rows, a conveyor extending longitudinally between the rack members, means for adjusting the conveyor vertically, of a pallet lifting device comprising a carriage adapted to travel on a suitable track between the rack members, a pallet lifting device mounted upon the carriage provided with revolving crank arms adapted to engage beneath the centre of the pallet at their free ends to transfer the pallet between each of a horizontal series of opposing rack ledges and the conveyor.

3. In a device of the class described, the combination with opposing rack ledges arranged in spaced apart vertical rows, a conveyor extending longitudinally between the rack members, means for adjusting the conveyor vertically, of a pallet lifting device comprising a carriage adapted to travel on suitable tracks between the rack members, upper and lower crank shafts mounted in bearings upon the carriage, crank arms extending therefrom, link members connecting the cranks together, means for revolving the crank shafts so that the outer end of the upper crank arms operate beneath the centre of the pallet to lift the same and deposit it on opposing rack ledges, and means for moving the carriage by a step by step movement so that the lifting cranks transfer the pallet and bricks successively between each of the horizontal series of the rack ledges and the conveyor.

4. In an apparatus for transferring bricks from a press to drying racks and from such drying racks to a kiln, a pair of opposing rack members provided with pallet receiving ledges arranged in spaced apart vertical rows, a conveyor extending longitudinally between the rack members, means for adjusting the conveyor vertically, means for transferring bricks from the conveyor onto ledges of any one of the vertical rows, an inclined roller conveyor, means for depositing the pallet and bricks as it is discharged from the press onto the roller conveyor to pass downward thereover, an inclined conveyor connected to the main conveyor to travel in unison therewith and supported at its lower end on a movable carriage, a hinge connection between the carriage and the lower end of the roller conveyor, a roller conveyor at the opposite end of the main conveyor hingedly connected thereto, and a longitudinally movable conveyor adapted to receive the pallets and bricks from the last mentioned roller conveyor and transfer them into the kiln.

GILMOUR JOHNSON STEELE.